US011891903B2

(12) United States Patent
Lefebvre et al.

(10) Patent No.: US 11,891,903 B2
(45) Date of Patent: Feb. 6, 2024

(54) BORESCOPE PLUG ASSEMBLY

(71) Applicant: Pratt & Whitney Canada Corp., Longueuil (CA)

(72) Inventors: Guy Lefebvre, St Bruno de Montarville (CA); Francois Doyon, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/724,035

(22) Filed: Apr. 19, 2022

(65) Prior Publication Data
US 2023/0332512 A1    Oct. 19, 2023

(51) Int. Cl.
*F01D 21/00* (2006.01)
*F02C 7/00* (2006.01)
*F02C 7/18* (2006.01)
*G01M 15/02* (2006.01)
*G01M 15/14* (2006.01)

(52) U.S. Cl.
CPC .............. *F01D 21/003* (2013.01); *F02C 7/00* (2013.01); *F02C 7/18* (2013.01); *G01M 15/02* (2013.01); *G01M 15/14* (2013.01); *F05D 2220/32* (2013.01); *F05D 2260/83* (2013.01)

(58) Field of Classification Search
CPC .......... F01D 21/003; F01D 17/02; F02C 7/00; F02C 7/18; G01M 15/02; G01M 15/14; F05D 2220/32; F05D 2260/33; F05D 2260/80; F05D 2260/83
See application file for complete search history.

(56) References Cited

U.S. PATENT DOCUMENTS

| 3,362,160 | A | * | 1/1968 | Bourgeois | ............. | F01D 21/003 |
| | | | | | | 415/126 |
| 4,300,774 | A | | 11/1981 | Hollis | | |
| 4,668,162 | A | * | 5/1987 | Cederwall | ............... | B23B 51/00 |
| | | | | | | 415/115 |
| 4,815,276 | A | * | 3/1989 | Hansel | .................... | F01D 25/00 |
| | | | | | | 60/803 |

(Continued)

FOREIGN PATENT DOCUMENTS

CN    110186686 B    7/2021

OTHER PUBLICATIONS

EP Search Report for EP Patent Application No. 23168819.3 dated Nov. 3, 2023.

*Primary Examiner* — Elton K Wong
(74) *Attorney, Agent, or Firm* — Getz Balich LLC

(57) ABSTRACT

A borescope plug assembly includes a housing, a plug, and a spring. The housing extends between a first housing end and a second housing end. The housing includes a plug aperture, an internal chamber, and a bayonet interface. The plug aperture is located at the second housing end. The internal chamber extends from the plug aperture toward the first housing end. The plug includes a shaft, a first sealing surface, and at least one tab. The shaft extends between a first shaft end and a second shaft end. The first sealing surface is disposed at the first shaft end. The at least one tab projects radially outward from the shaft. The plug extends through the plug aperture with the second shaft end and the at least one tab disposed within the internal chamber. The spring is positioned within the internal chamber between the first housing end and the at least one tab.

15 Claims, 4 Drawing Sheets

(56) References Cited

U.S. PATENT DOCUMENTS

| | | | |
|---|---|---|---|
| 5,431,534 A | 7/1995 | Charbonnel | |
| 6,468,033 B1 * | 10/2002 | Weidlich | F01D 21/003 415/118 |
| 3,047,769 A1 | 11/2011 | Ballard, Jr. | |
| 2009/0202340 A1 | 8/2009 | Ballard, Jr. | |
| 2010/0166537 A1 * | 7/2010 | Walker | F01D 25/24 60/803 |
| 2010/0215477 A1 * | 8/2010 | Wilson | F02C 3/067 415/177 |
| 2015/0125267 A1 * | 5/2015 | Hatcher, Jr. | F01D 21/003 29/888.021 |
| 2016/0169032 A1 * | 6/2016 | Porter | F01D 21/003 415/118 |
| 2018/0363692 A1 * | 12/2018 | Patel | F16B 5/0241 |
| 2019/0368375 A1 | 12/2019 | Dickens | |

\* cited by examiner

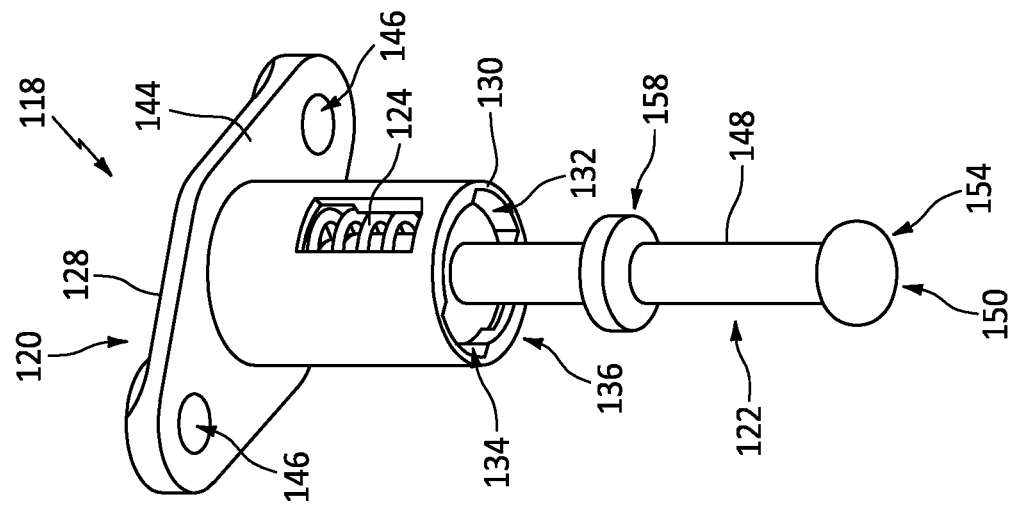
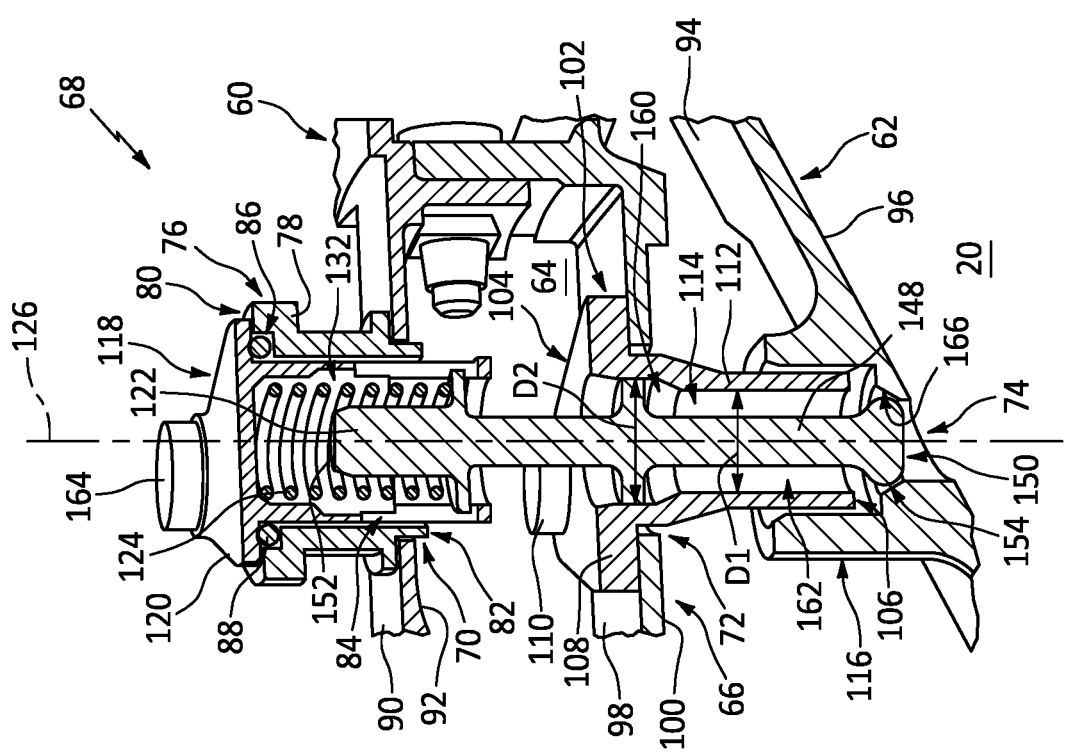

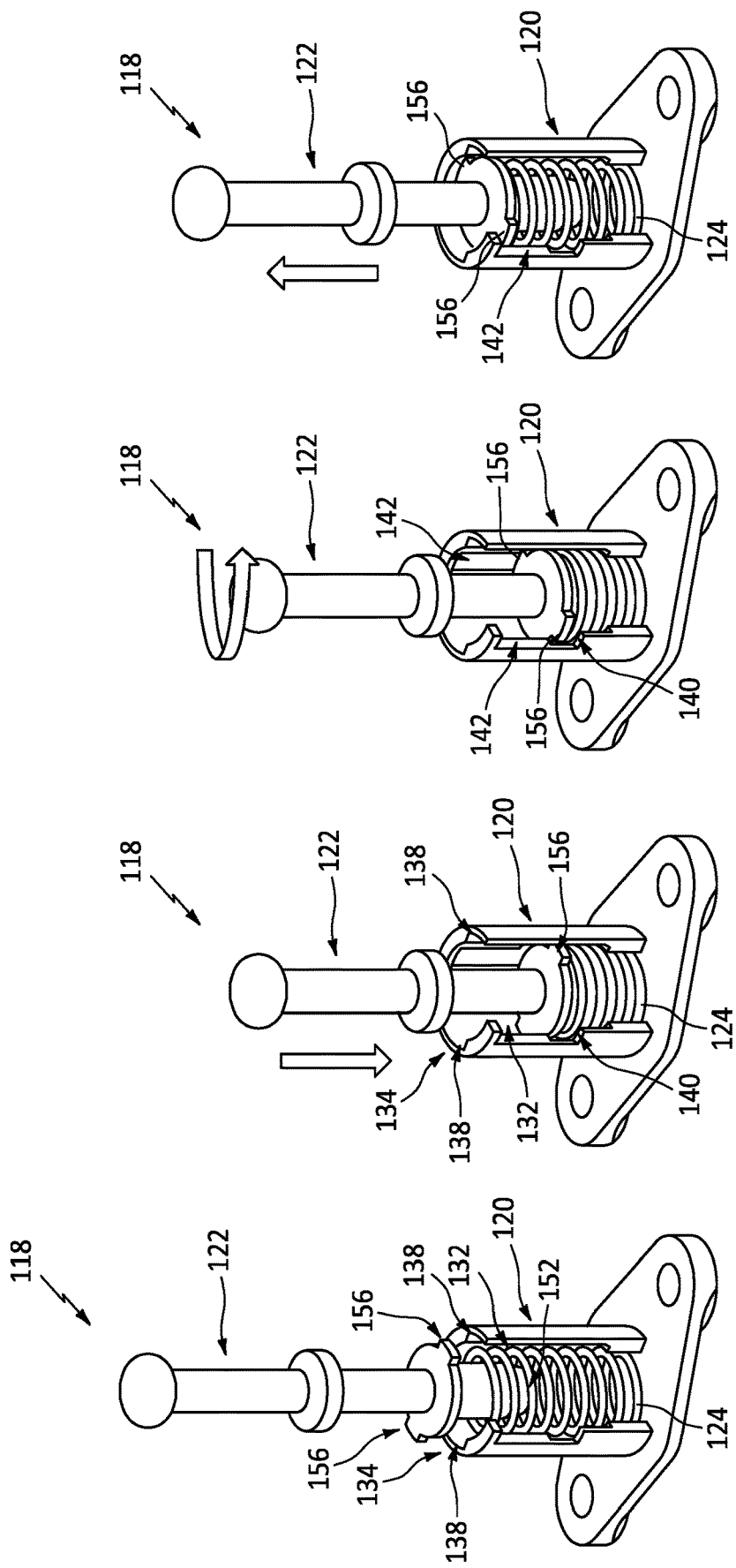

BORESCOPE PLUG ASSEMBLY

TECHNICAL FIELD

This disclosure relates generally to sealing assemblies for adjacent cavities and more particularly to borescope plug assemblies for gas turbine engine cases.

BACKGROUND OF THE ART

A gas turbine engine may include a series of adjacent engine cases or other frames, walls, etc. which define one or more internal cavities. The engine cases may include one or more inspection holes configured to accommodate access for borescopes and other tools. For example, the inspection holes may allow access for inspection of the gas turbine engine internal cavities which may include, for example, fluid flow paths, cooling cavities, and the like. The inspection holes of adjacent engine cases may be aligned to allow a borescope or other tool to be inserted through the engine cases. The inspection holes may be sealed during operation of the gas turbine engine to prevent fluid leakage between cavities separated by the adjacent engine cases. There is a need for improved sealing systems for gas turbine engine inspection holes.

SUMMARY

It should be understood that any or all of the features or embodiments described herein can be used or combined in any combination with each and every other feature or embodiment described herein unless expressly noted otherwise.

According to an aspect of the present disclosure, a borescope plug assembly includes a housing extending between a first housing end and a second housing end. The housing includes a plug aperture, an internal chamber, and a bayonet interface. The plug aperture is located at the second housing end. The internal chamber extends from the plug aperture toward the first housing end. The bayonet interface is disposed about the internal chamber. The borescope plug assembly further includes a plug including a shaft, a first sealing surface, and at least one tab. The shaft extends between a first shaft end and a second shaft end along a plug axis. The first sealing surface is disposed at the first shaft end. The at least one tab projects radially outward from the shaft. The plug extends through the plug aperture with the second shaft end and the at least one tab disposed within the internal chamber. The at least one tab is configured to engage the bayonet interface such that the plug is selectively engaged with the housing. The borescope plug assembly further includes a spring positioned within the internal chamber between the first housing end and the at least one tab. The spring is configured to bias the plug in an axially outward direction away from the housing.

In any of the aspects or embodiments described above and herein, the borescope plug assembly may further include an outer case and an inner case spaced from the outer case. The inner case may include a third aperture and a second sealing surface. The second sealing surface may surround the third aperture. The housing may be mounted to the outer case with the first sealing surface in contact with the second sealing surface.

In any of the aspects or embodiments described above and herein, the outer case may include a first aperture and a housing guide. The housing guide may be disposed about the first aperture. The housing may be positioned within the first aperture and the housing guide. The housing may be mounted to the housing guide.

In any of the aspects or embodiments described above and herein, the borescope plug assembly may further include a seal ring positioned between the housing and the housing guide.

In any of the aspects or embodiments described above and herein, the borescope plug assembly may further include a restrictor pin fixedly mounted to the outer case. The restrictor pin may be in sliding contact with the inner case. The plug may extend through the restrictor pin.

In any of the aspects or embodiments described above and herein, the plug may further include a circular restrictor extending radially outward from the shaft. The circular restrictor may be positioned axially between the first shaft end and the at least one tab with respect to the plug axis. The circular restrictor may be configured for sliding contact with the restrictor pin as the plug translates along the plug axis.

In any of the aspects or embodiments described above and herein, the borescope plug assembly may further include an intermediate wall mounted to the outer case. The intermediate wall may be positioned between the outer case and the inner case. The restrictor pin may be mounted to and extend through the intermediate wall. The outer case and the intermediate wall may form a cooling air cavity between the outer case and the intermediate wall.

In any of the aspects or embodiments described above and herein, the bayonet interface may include at least one groove, a circular groove, and at least one slot. The at least one groove, the circular groove, and the at least one slot may be formed in the housing. The at least one groove may extend axially from the second housing end to the circular groove. The circular groove may surround the internal chamber. The at least one slot may be circumferentially offset from the at least one groove.

In any of the aspects or embodiments described above and herein, the plug may further include a circular restrictor. The circular restrictor may extend radially outward from the shaft. The circular restrictor may be positioned axially between the first shaft end and the at least one tab.

According to another aspect of the present disclosure, a gas turbine engine includes an outer engine case surrounding a turbine section of the gas turbine engine. The outer engine case is disposed about an axial centerline of the gas turbine engine. The gas turbine engine further includes a mid-turbine frame disposed radially inside of the outer engine case. The mid-turbine frame includes an interior side and an exterior side. The interior side forms at least a portion of a core flow path through the turbine section. The mid-turbine frame further includes a third aperture and a second sealing surface surrounding the third aperture. The third aperture extends through the mid-turbine frame from the interior side to the exterior side The gas turbine engine further includes a housing mounted to the outer engine case. The housing includes an internal chamber and a bayonet interface. The gas turbine engine further includes a plug including a shaft, a first sealing surface, and at least one tab. The shaft extends between a first shaft end and a second shaft end along a plug axis. The first sealing surface is disposed at the first shaft end. The at least one tab projects radially outward from the shaft. The at least one tab disposed within the internal chamber. The at least one tab is configured to engage the bayonet interface. The gas turbine engine further includes a spring positioned within the internal chamber between housing and the at least one tab. The spring is configured to bias the plug in an axially outward direction away from the housing.

In any of the aspects or embodiments described above and herein, the gas turbine engine may further include a restrictor pin fixedly mounted to the outer engine case. The restrictor pin may be in sliding contact with the mid-turbine frame. The plug may extend through the restrictor pin.

In any of the aspects or embodiments described above and herein, the plug may further include a circular restrictor extending radially outward from the shaft. The circular restrictor may be positioned axially between the first shaft end and the at least one tab. The restrictor may be configured for sliding contact with the restrictor pin as the plug translates along the plug axis.

In any of the aspects or embodiments described above and herein, the gas turbine engine may further include an intermediate wall mounted to the outer engine case. The intermediate wall may be positioned between the outer engine case and the mid-turbine frame. The restrictor pin may be mounted to and extend through the intermediate wall. The outer engine case and the intermediate wall may form a cooling air cavity between the outer engine case and the intermediate wall.

In any of the aspects or embodiments described above and herein, the mid-turbine frame may further include a projecting portion surrounding the third aperture. The projecting portion may project radially outward from the mid-turbine frame. The projecting portion may surround a portion of the restrictor pin.

According to another aspect of the present disclosure, a borescope plug assembly includes a housing extending between a first housing end and a second housing end. The housing includes a plug aperture and internal chamber. The plug aperture is located at the second housing end. The internal chamber extends from the plug aperture toward the first housing end. The borescope plug assembly further includes a plug including a shaft, a first sealing surface, and a circular restrictor. The shaft extends between a first shaft end and a second shaft end along a plug axis. The first sealing surface is disposed at the first shaft end. The circular restrictor extends radially outward from the shaft. The circular restrictor is positioned axially between the first shaft end and the second shaft end. The plug extends through the plug aperture with the second shaft end disposed within the internal chamber. The borescope plug assembly further includes a spring positioned within the internal chamber between the first housing end and plug. The spring is configured to bias the plug in an axially outward direction away from the housing.

In any of the aspects or embodiments described above and herein, the borescope plug assembly may further include an outer case and an inner case spaced from the outer case. The inner case includes a third aperture and a second sealing surface surrounding the third aperture. The housing is mounted to the outer case with the first sealing surface in contact with the second sealing surface.

In any of the aspects or embodiments described above and herein, the borescope plug assembly may further include a restrictor pin fixedly mounted to the outer case. The restrictor pin may be in sliding contact with the inner case. The plug may extend through the restrictor pin.

In any of the aspects or embodiments described above and herein, the circular restrictor may be positioned in sliding contact with the restrictor pin.

In any of the aspects or embodiments described above and herein, the restrictor pin may include a restrictor aperture. The plug may extend through the restrictor aperture. The restrictor aperture may include a first diameter portion and a second diameter portion. A first diameter of the first diameter portion is greater than a second diameter of the second diameter portion. The circular restrictor is positioned within the first diameter portion of the restrictor aperture.

In any of the aspects or embodiments described above and herein, the borescope plug assembly may further include an intermediate wall mounted to the outer case. The intermediate wall may be positioned between the outer case and the inner case. The restrictor pin may be mounted to and extend through the intermediate wall. The outer case and the intermediate wall may form a cooling air cavity between the outer case and the intermediate wall.

The present disclosure, and all its aspects, embodiments and advantages associated therewith will become more readily apparent in view of the detailed description provided below, including the accompanying drawings.

DESCRIPTION OF THE DRAWINGS

FIG. 2 illustrates a perspective, cutaway view of a portion of the gas turbine engine of FIG. 1 including a borescope plug assembly, in accordance with one or more embodiments of the present disclosure.

FIG. 3 illustrates a perspective view of a borescope plug device for the borescope assembly of FIG. 2, in accordance with one or more embodiments of the present disclosure.

FIGS. 7-10 illustrate perspective, cutaway views of the borescope plug device of FIG. 3 depicting a sequence for operating the borescope plug device, in accordance with one or more embodiments of the present disclosure.

DETAILED DESCRIPTION

Figure 1:
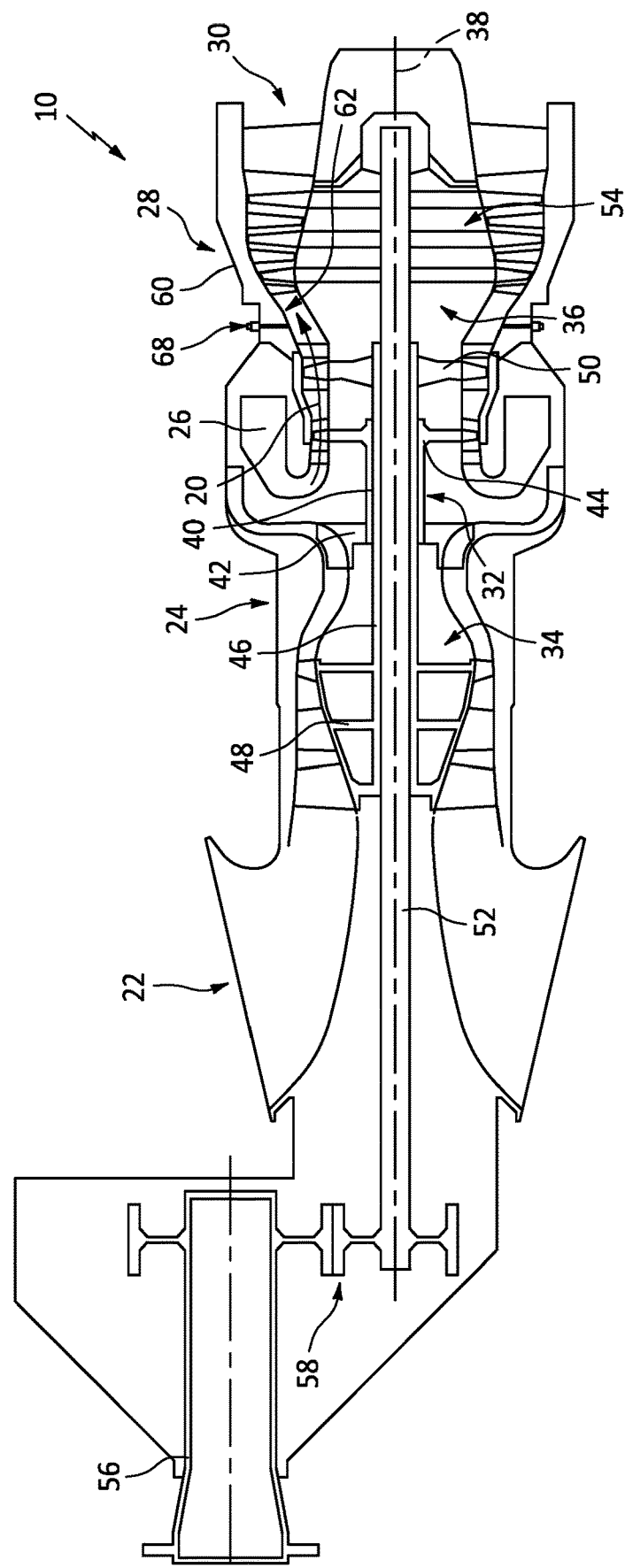
FIG. 1 illustrates a side, sectional view of a gas turbine engine, in accordance with one or more embodiments of the present disclosure.
Figure 6:
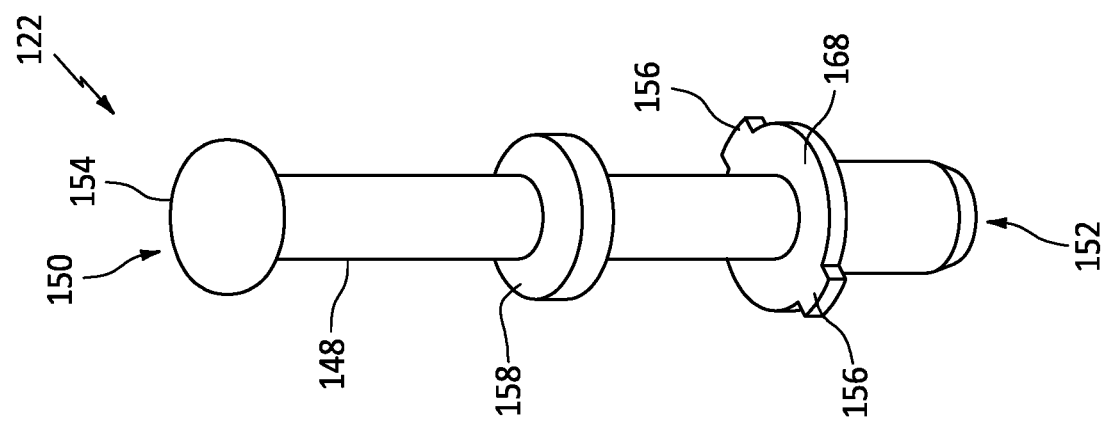
FIG. 6 illustrates a perspective, cutaway view of a portion of the borescope plug device of FIG. 3, in accordance with one or more embodiments of the present disclosure.

FIG. 1 illustrates a side, sectional view of a gas turbine engine 10. This gas turbine engine 10 includes a core flow path 20. This gas turbine engine 10 further includes an air inlet 22, a compressor section 24, a combustor 26, a turbine section 28, and an exhaust section 30. The air inlet 22, the compressor section 24, the combustor 26, the turbine section 28, and the exhaust section 30 each form portions of the core flow path 20. The compressor section 24 drives air from the air inlet 22 along the core flow path 20 for compression and communication into the combustor 26, and expansion through the turbine section 28.

The gas turbine engine 10 of FIG. 1 includes a first rotational assembly 32 (e.g., a high-pressure spool), a second rotational assembly 34 (e.g., a low-pressure spool), and a third rotational assembly 36 (e.g., a power spool). The first rotational assembly 32, the second rotational assembly 34, and the third rotational assembly 36 are mounted for rotation about an axial centerline 38 (e.g., a rotational axis) of the gas turbine engine 10. The first rotational assembly 32 includes a first shaft 40, a first compressor 42, and a first turbine 44. The first shaft 40 interconnects the first compressor 42 and the first turbine 44. The second rotational assembly 34 includes a second shaft 46, a second compressor 48, and a second turbine 50. The second shaft 46 interconnects the second compressor 48 and the second turbine 50. The third rotational assembly 36 includes a drive output shaft 52 and a power turbine 54. The drive output shaft 52 is in rotational communication with the power turbine 54. The drive output shaft 52 is configured to drive a rotatable load 56 in response to rotation of the power turbine 54. The rotatable load 56 may take the form of a propeller or another type of rotor. The gas turbine engine 10 of FIG. 1 is a multi-spool turboprop engine. However, it should be understood that aspects of the present disclosure may be equally applicable to other types of gas turbine engines including, but not limited to, a turboshaft gas turbine engine, a turbofan gas turbine engine, and a turbojet gas turbine engine, as well as a gas turbine engine having a single-spool or a two-spool architecture.

Referring to FIGS. 1 and 2, the gas turbine engine 10 includes an outer engine case 60 disposed about the axial centerline 38. The outer engine case 60 surrounds at least a portion of one or more of the compressor section 24, the combustor 26, and the turbine section 28. The outer engine case 60 of FIG. 2 includes an exterior side 90 and an interior side 92. The gas turbine engine 10 of FIG. 1 further includes a mid-turbine frame 62 disposed about the axial centerline 38. The mid-turbine frame 62 is positioned radially inside of the outer engine case 60. The mid-turbine frame 62 is axially positioned between the second turbine 50 and the power turbine 54. The mid-turbine frame 62 of FIG. 2 includes an exterior side 94 and an interior side 96. The mid-turbine frame 62 of FIG. 1 may support one or more bearings (not shown) for rotatably supporting the second rotational assembly 34 and/or the third rotational assembly 36. Additionally, the mid-turbine frame 62 may form at least a portion of the core flow path 20 between the second turbine 50 and the power turbine 54.

Referring to FIG. 2, the gas turbine engine 10 may include one or more air cavities 64 disposed between the outer engine case 60 and the mid-turbine frame 62. For example, the air cavity 64 of FIG. 2 is formed, at least in part, between the outer engine case 60 and an intermediate wall 66 fixedly mounted to the outer engine case 60. The intermediate wall 66 may be positioned between the outer engine case 60 and the mid-turbine frame 62. The intermediate wall 66 includes an exterior side 98 and an interior side 100. The intermediate wall 66 may be radially spaced from the mid-turbine frame 62, relative to the axial centerline 38, to accommodate differences in thermal expansion of the mid-turbine frame 62 relative to the outer engine case 60.

The gas turbine engine 10 includes at least one borescope plug assembly 68. The borescope plug assembly 68 of FIG. 2 is configured to allow inspection (e.g., using a borescope) of one or more internal portions (e.g., cavities) of the gas turbine engine 10 such as, but not limited to, the air cavity 64, a region between the intermediate wall 66 and the mid-turbine frame 62, and the core flow path 20 radially inside of the mid-turbine frame 62. Moreover, the borescope plug assembly 68 is configured to seal one or more cavities (e.g., the air cavity 64) during operation of the gas turbine engine 10. The borescope plug assembly 68 of FIG. 2 may, therefore, be understood to include portions of the outer engine case 60, the mid-turbine frame 62, and the intermediate wall 66 as well as a plurality of apertures extending through the outer engine case 60, mid-turbine frame 62, and the intermediate wall 66. For example, the outer engine case 60 may include a first aperture 70, the intermediate wall 66 may include a second aperture 72, and the mid-turbine frame 62 may include a third aperture 74. The first aperture 70, the second aperture 72, and the third aperture 74 may be aligned (e.g., co-axial) or substantially aligned with one another to accommodate the insertion of a borescope therethrough. While the borescope plug assembly 68 is described herein with respect to the outer engine case 60, the mid-turbine frame 62, and the intermediate wall 66 of the turbine section 28, it should be understood that aspects of the present disclosure borescope plug assembly 68 are also applicable to any series of adjacent or staggered cases, frames, walls, or other barriers forming one or more cavities for which inspection and/or sealing may be desired.

The borescope plug assembly 68 may include a housing guide 76 mounted to the outer engine case 60 at (e.g., on, adjacent, or proximate) the exterior side 90 proximate the first aperture 70. The housing guide 76 includes an annular body 78. The annular body 78 extends between a first end 80 and a second end 82. The annular body 78 forms an inspection access hole 84 extending through the annular body 78 from the first end 80 to the second end 82. The housing guide 76 may be mounted to the outer engine case 60 with the annular body 78 disposed about and/or within the first aperture 70 such as the inspection access hole 84 is coincident with and/or extends through the first aperture 70. The annular body 78 may include an annular groove 86 disposed about the inspection access hole 84 at the first end 80. The housing guide 76 may include a seal ring 88 disposed within the annular groove 86.

The borescope plug assembly 68 may include a restrictor pin 102. The restrictor pin 102 may be fixedly mounted to the outer engine case 60. For example, the restrictor pin 102 of FIG. 2 is mounted to the intermediate wall 66. The restrictor pin 102 may be configured to contact (e.g., slidingly contact) the mid-turbine frame 62. The restrictor pin 102 extends between a first end 104 and a second end 106. The restrictor pin 102 may include a flange portion 108, a first projecting portion 112, and a restrictor aperture 114. The flange portion 108 may be located at the first end 104. The flange portion 108 may be mounted to the intermediate wall 66 by one or more fasteners 110. For example, the flange portion 108 may be mounted to the intermediate wall 66 at the exterior side 98. The first projecting portion 112 may extend through the second aperture 72 to the second end 106. The first projecting portion 112 may extend radially inward from the intermediate wall 66 toward the mid-turbine frame 62. The restrictor aperture 114 may extend through the restrictor pin 102 from the first end 104 to the second end 106. The restrictor aperture 114 may have a diameter D1 which varies between the first end 104 and the second end 106. For example, the restrictor aperture 114 of FIG. 2 includes a first diameter portion 160 and a second diameter portion 162. The first diameter portion 160 is positioned adjacent the first end 104. The second diameter portion 162 is positioned adjacent the second end 106. The diameter D1 of the restrictor aperture 114 within the first diameter portion 160 may be greater than the diameter D1 of the restrictor aperture 114 within the second diameter portion 162.

The mid-turbine frame 62 may include a second projecting portion 116 (e.g., a tubular boss and/or mount). The second projecting portion 116 may extend radially outward from the mid-turbine frame 62 toward the intermediate wall 66. The second projecting portion 116 may be an integral portion of the mid-turbine frame 62 or may otherwise be mounted to the mid-turbine frame 62. The second projecting portion 116 may be disposed about the third aperture 74. The second projecting portion 116 may be configured to surround and contact the first projecting portion 112. The first projecting portion 112 may be in sliding contact with or otherwise translatable within the second projecting portion 116. For example, the first projecting portion 112 may be in sliding contact with the second projecting portion 116 as the mid-turbine frame 62 thermally expands and contracts and, therefore, moves radially (e.g., outward or inward) relative to the outer engine case 60 and/or the intermediate wall 66. Engagement between the first projecting portion 112 and the second projecting portion 116 may facilitate proper alignment of the mid-turbine frame 62 as the mid-turbine frame 62 thermally expands and contracts during operation of the gas turbine engine 10. Engagement between the first projecting portion 112 and the second projecting portion 116 may additionally provide sealing between the restrictor pin 102 and the mid-turbine frame 62, thereby reducing leakage into the cavity between the outer engine case 60 and the mid-turbine frame 62.

Figure 5:
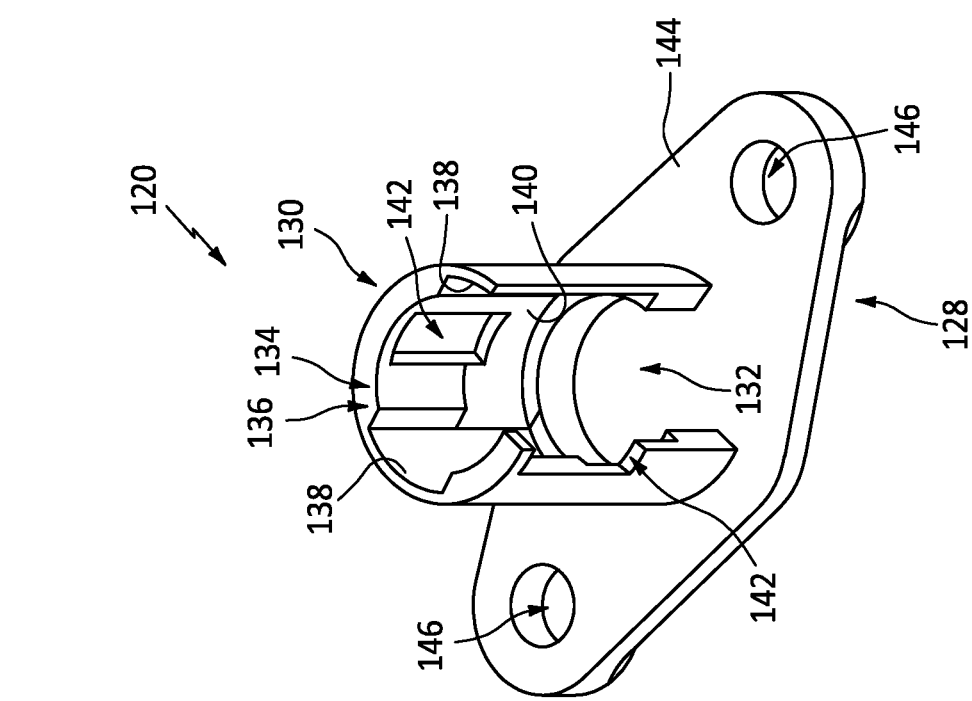
FIG. 5 illustrates a perspective, cutaway view of a portion of the borescope plug device of FIG. 3, in accordance with one or more embodiments of the present disclosure.
Figure 4:
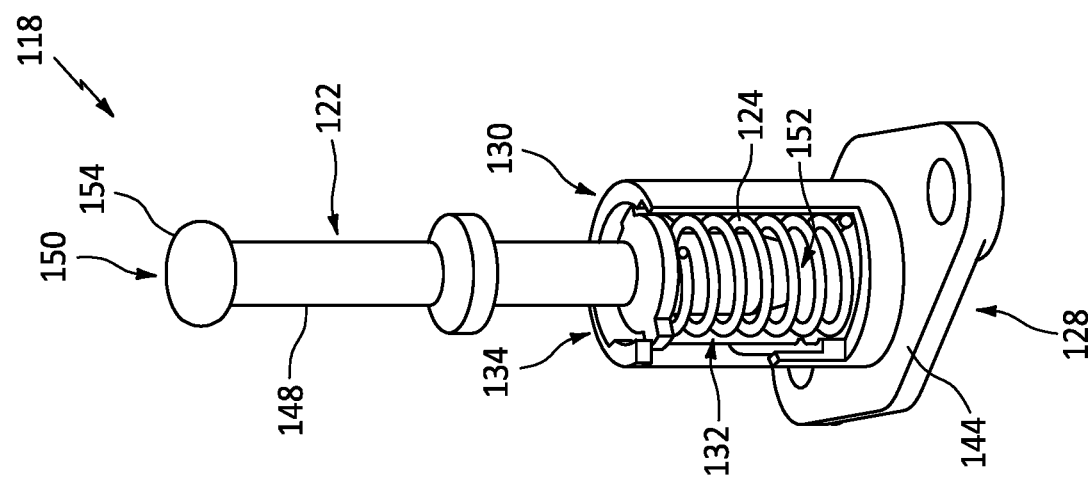
FIG. 4 illustrates a perspective, cutaway view of the borescope plug device of FIG. 3, in accordance with one or more embodiments of the present disclosure.

Referring to FIGS. 2-6, the borescope plug assembly 68 includes a borescope plug device 118. The borescope plug device 118 includes a housing 120, a plug 122, and a spring 124. The housing 120, the plug 122, and the spring 124 extend along a plug axis 126. The housing 120 includes a first end 128 and a second end 130. The housing 120 includes a plug aperture 134 formed in the second end 130. The housing 120 forms an internal chamber 132 which extends from the plug aperture 134 toward the first end 128. The housing 120 includes a bayonet interface 136. As shown in FIG. 5, the bayonet interface 136 may include at least one groove 138 formed in the housing 120. The at least one groove 138 may extend axially from the second end 130 to a circular groove 140 formed in the housing 120. The circular groove 140 may surround the internal chamber 132. The bayonet interface 136 may further include at least one slot 142 formed through the housing 120. The at least one slot 142 may be circumferentially offset from the at least one groove 138 with respect to the plug axis 126. The at least one slot 142 may extend axially from the circular groove 140 with respect to the plug axis 126. The housing 120 may further include a flange portion 144 located at the first end 128 of the housing 120. The flange portion 144 may include one or more fastener apertures 146 configured to receive respective fasteners 164 for mounting the housing 120 to the outer engine case 60 and/or the housing guide 76 of FIG. 2.

The plug 122 of the borescope plug device 118 includes a shaft 148, a first sealing surface 154, and at least one tab 156. The shaft 148 extends between a first end 150 and a second end 152 along the plug axis 126. The first sealing surface 154 is disposed at the first end 150. The at least one tab 156 project radially outward from the shaft 148 with respect to the plug axis 126. The at least one tab 156 may project from opposing circumferential portions of the shaft 148 as shown, for example, in FIG. 6. The plug 122 may include a ring 168 surrounding and projecting radially outward from the shaft 148 with respect to the plug axis 126. The ring 168 may be sized to fit snuggly within the internal chamber 132 of the housing 120. Each of the at least one tab 156 may project radially outward from the ring 168 with respect to the plug axis 126. The plug 122 extends through the plug aperture 134 of the housing 120 with the second end 152 and the at least one tab 156 disposed within the internal chamber 132 of the housing 120. As will be discussed in further detail, the at least one tab 156 is configured to engage the bayonet interface 136 of the housing 120 such that the plug 122 is selectively engaged with and retained by the housing 120.

The spring 124 of the borescope plug device 118 is positioned within the internal chamber 132 of the housing 120. The spring 124 may surround a portion of the shaft 148 of the plug 122 adjacent and including the second end 152 of the shaft 148. The spring 124 may be positioned between the first end 128 of the housing 120 and the at least one tab 156. Accordingly, the spring 124 may be configured to bias the plug 122 in an axially outward direction away from the housing 120, relative to the plug axis 126.

In some embodiments, the plug 122 may include a circular restrictor 158. The circular restrictor 158 may surround and extend radially outward from the shaft 148. The circular restrictor 158 may be positioned axially between the first end 150 and the at least one tab 156, with respect to the plug axis 126. The circular restrictor 158 has a diameter D2. The diameter D2 of the circular restrictor 158 may be the same as or substantially the same as the diameter D1 of the restrictor aperture 114 within the first diameter portion 160, such that the circular restrictor 158 may form a seal between the plug 122 and the restrictor pin 102.

FIG. 2 illustrates the borescope plug device 118 installed in the borescope plug assembly 68. The housing 120 of the borescope plug device 118 may be positioned within the first aperture 70 and/or the inspection access hole 84. The housing 120 may be selectively mounted to the housing guide 76 using the one or more fasteners 164. With the housing 120 of the borescope plug device 118 installed in the housing guide 76, the seal ring 88 may be positioned between the housing 120 and the housing guide 76 to provide a seal between the housing 120 and the housing guide 76. The first sealing surface 154 is sealingly engaged with a second sealing surface 166 of the mid-turbine frame 62. The second sealing surface 166 surrounds the third aperture 74 of the mid-turbine frame 62. The bias provided by the spring 124 maintains the first sealing surface 154 of the plug 122 in contact with the second sealing surface 166 of the mid-turbine frame 62 as the mid-turbine frame 62 thermally expands and contracts during operation of the gas turbine engine 10. For example, the plug 122 may translate along the plug axis 126 in response to thermal expansion and contraction of the mid-turbine frame 62 and/or the outer engine case 60. The plug 122 extends through the restrictor pin 102 (e.g., through the restrictor aperture 114) between the housing 120 and the mid-turbine frame 62. The circular restrictor 158 of the plug 122 may be positioned within the first diameter portion 160 of the restrictor aperture 114 of the restrictor pin 102. The circular restrictor 158 may be configured for sliding contact with the restrictor pin 102 as the plug 122 translates along the plug axis 126 in response to thermal expansion and contraction of the mid-turbine frame 62 and/or the outer engine case 60. The interface between the circular restrictor 158 and the restrictor pin 102 may, therefore, facilitate axial alignment of the plug 122 as the plug 122 translates along the plug axis 126. The interface between the circular restrictor 158 and the restrictor pin 102 may also maintain the seal between the plug 122 and the restrictor pin 102 throughout the expected range of mid-turbine frame 62 movement due to thermal expansion and contraction.

Referring to FIGS. 7-10, a sequence for installing the plug 122 in the housing 120 of the borescope plug device 118 is illustrated. As shown in FIGS. 7 and 8, the second end 152 of the plug 122 is inserted into the internal chamber 132 of the housing 120 via the plug aperture 134. The plug 122 is inserted with the at least one tab 156 aligned with respective grooves of the at least one groove 138 so that the at least one tab 156 travels within the at least one groove 138 in a generally axial direction relative to the plug axis 126 (see FIG. 2). The plug 122 is inserted against the spring 124 until the at least one tab 156 is positioned within the circular groove 140. As shown in FIG. 9, with the at least one tab 156 positioned within the circular groove 140, the plug 122 may be rotated relative to the plug axis 126 (see FIG. 2) until the at least one tab 156 is positioned within respective slots of the at least one slot 142. As shown in FIG. 10, with the at least one tab 156 positioned within the at least one slot 142, the plug 122 may be released. The spring bias providing by the spring 124 may then push the plug 122 outward so that the at least one tab 156 is retained between and in contact with the spring 124 and the housing 120. With this configuration, the plug 122 may be installed in the borescope plug device 118 relatively quickly and, for example, without the use of any additional tools. With the plug 122 installed in the borescope plug device 118, the borescope plug device 118 may be installed in the borescope plug assembly 68 as described above. Removal of the plug 122 from the borescope plug device 118 may be performed by substantially reversing the sequence illustrated in FIGS. 7-10.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A borescope plug assembly comprising:
an outer case;
an inner case spaced from the outer case, the inner case including a third aperture and a second sealing surface, the second sealing surface surrounding the third aperture;
a restrictor pin fixedly mounted to the outer case, the restrictor pin in sliding contact with the inner case;
a housing extending between a first housing end and a second housing end, the housing including a plug aperture, an internal chamber, and a bayonet interface, the plug aperture located at the second housing end, the internal chamber extending from the plug aperture toward the first housing end, and the bayonet interface disposed about the internal chamber, the housing mounted to the outer case;
a plug including a shaft, a first sealing surface, and at least one tab, the shaft extending between a first shaft end and a second shaft end along a plug axis, the first sealing surface disposed at the first shaft end, the at least one tab projecting radially outward from the shaft, the plug extending through the plug aperture with the second shaft end and the at least one tab disposed within the internal chamber, and the at least one tab configured to engage the bayonet interface such that the plug is selectively engaged with the housing with the first sealing surface in contact with the second sealing surface and with the plug extending through the restrictor pin; and
a spring positioned within the internal chamber between the first housing end and the at least one tab, the spring configured to bias the plug in an axially outward direction away from the housing.

2. The borescope plug assembly of claim 1, wherein the outer case includes a first aperture and a housing guide, the housing guide disposed about the first aperture, the housing positioned within the first aperture and the housing guide, and the housing mounted to the housing guide.

3. The borescope plug assembly of claim 2, further comprising a seal ring positioned between the housing and the housing guide.

4. The borescope plug assembly of claim 1, wherein the plug further includes a circular restrictor extending radially outward from the shaft, the circular restrictor positioned axially between the first shaft end and the at least one tab with respect to the plug axis, and the circular restrictor configured for sliding contact with the restrictor pin as the plug translates along the plug axis.

5. The borescope plug assembly of claim 4, further comprising an intermediate wall mounted to the outer case, the intermediate wall positioned between the outer case and the inner case, the restrictor pin mounted to and extending through the intermediate wall with the intermediate wall fixedly mounting the restrictor pin to the outer case, and the outer case and the intermediate wall forming a cooling air cavity between the outer case and the intermediate wall.

6. The borescope plug assembly of claim 1, wherein the bayonet interface includes at least one groove, a circular groove, and at least one slot, the at least one groove, the circular groove, and the at least one slot formed in the housing, the at least one groove extending axially from the second housing end to the circular groove, the circular groove surrounding the internal chamber, and the at least one slot circumferentially offset from the at least one groove.

7. The borescope plug assembly of claim 1, wherein the plug further includes a circular restrictor, the circular restrictor extending radially outward from the shaft, and the circular restrictor positioned axially between the first shaft end and the at least one tab.

8. A gas turbine engine comprising:
an outer engine case surrounding a turbine section of the gas turbine engine, the outer engine case disposed about an axial centerline of the gas turbine engine;
a mid-turbine frame disposed radially inside of the outer engine case relative to the axial centerline, the mid-turbine frame including an interior side and an exterior side, the interior side forming at least a portion of a core flow path through the turbine section, the mid-turbine frame further including a third aperture and a second sealing surface surrounding the third aperture, and the third aperture extending through the mid-turbine frame from the interior side to the exterior side;
a restrictor pin fixedly mounted to the outer engine case, the restrictor pin in sliding contact with the mid-turbine frame;
a housing mounted to the outer engine case, the housing including a first housing end, a second housing end, an internal chamber, and a bayonet interface;
a plug extending through the restrictor pin, the plug including a shaft, a first sealing surface, and at least one tab, the shaft extending between a first shaft end and a second shaft end along a plug axis, the first sealing surface disposed at the first shaft end, the at least one tab projecting radially outward from the shaft relative to the plug axis, the at least one tab disposed within the internal chamber, and the at least one tab configured to engage the bayonet interface; and
a spring positioned within the internal chamber between the first housing end and the at least one tab, the spring configured to bias the plug in an axially outward direction away from the first housing end relative to the plug axis.

9. The gas turbine engine of claim 8, wherein the plug further includes a circular restrictor extending radially outward from the shaft relative to the plug axis, the circular restrictor positioned axially between the first shaft end and the at least one tab relative to the plug axis, and the restrictor configured for sliding contact with the restrictor pin as the plug translates along the plug axis.

10. The gas turbine engine of claim 9, further comprising an intermediate wall mounted to the outer engine case, the intermediate wall positioned between the outer engine case and the mid-turbine frame, the restrictor pin mounted to and extending through the intermediate wall with the intermediate wall fixedly mounting the restrictor pin to the outer case, and the outer engine case and the intermediate wall forming a cooling air cavity between the outer engine case and the intermediate wall.

11. The gas turbine engine of claim 9, wherein the mid-turbine frame further includes a projecting portion surrounding the third aperture, the projecting portion projecting radially outward from the mid-turbine frame relative to the axial centerline, and the projecting portion surrounding a portion of the restrictor pin.

12. A borescope plug assembly comprising:
an outer case;
an inner case spaced from the outer case, the inner case including a third aperture and a second sealing surface, the second sealing surface surrounding the third aperture;
an intermediate wall mounted to the outer case, the intermediate wall positioned between the outer case and the inner case;
a restrictor pin fixedly mounted to and extending through the intermediate wall, the restrictor pin in sliding contact with the inner case;
a housing extending between a first housing end and a second housing end, the housing including a plug aperture and an internal chamber, the plug aperture located at the second housing end, and the internal chamber extending from the plug aperture toward the first housing end, the housing mounted to the outer case;
a plug including a shaft, a first sealing surface, and a circular restrictor, the shaft extending between a first shaft end and a second shaft end along a plug axis, the first sealing surface disposed at the first shaft end, the circular restrictor extending radially outward from the shaft, the circular restrictor positioned axially between the first shaft end and the second shaft end, and the plug extending through the plug aperture with the second shaft end disposed within the internal chamber with the first sealing surface in contact with the second sealing surface and with the plug extending through the restrictor pin; and
a spring positioned within the internal chamber between the first housing end and plug, the spring configured to bias the plug in an axially outward direction away from the housing.

13. The borescope plug assembly of claim 12, wherein the circular restrictor is positioned in sliding contact with the restrictor pin.

14. The borescope plug assembly of claim 13, wherein the restrictor pin includes a restrictor aperture, the plug extending through the restrictor aperture, the restrictor aperture including a first diameter portion and a second diameter portion, a first diameter of the first diameter portion greater than a second diameter of the second diameter portion, and the circular restrictor positioned within the first diameter portion of the restrictor aperture.

15. The borescope plug assembly of claim 12, wherein the outer case and the intermediate wall form a cooling air cavity between the outer case and the intermediate wall.

* * * * *